Dec. 5, 1967 G. PERONNEAU ETAL 3,357,016
SECONDARY-RADAR RESPONSE SIMULATOR
Filed Feb. 10, 1966 8 Sheets-Sheet 1

INVENTORS
Georges Peronneau
Serge Mikailoff
Félix Floret
Paul L. Roman

BY Karl G. Ross
Attorney

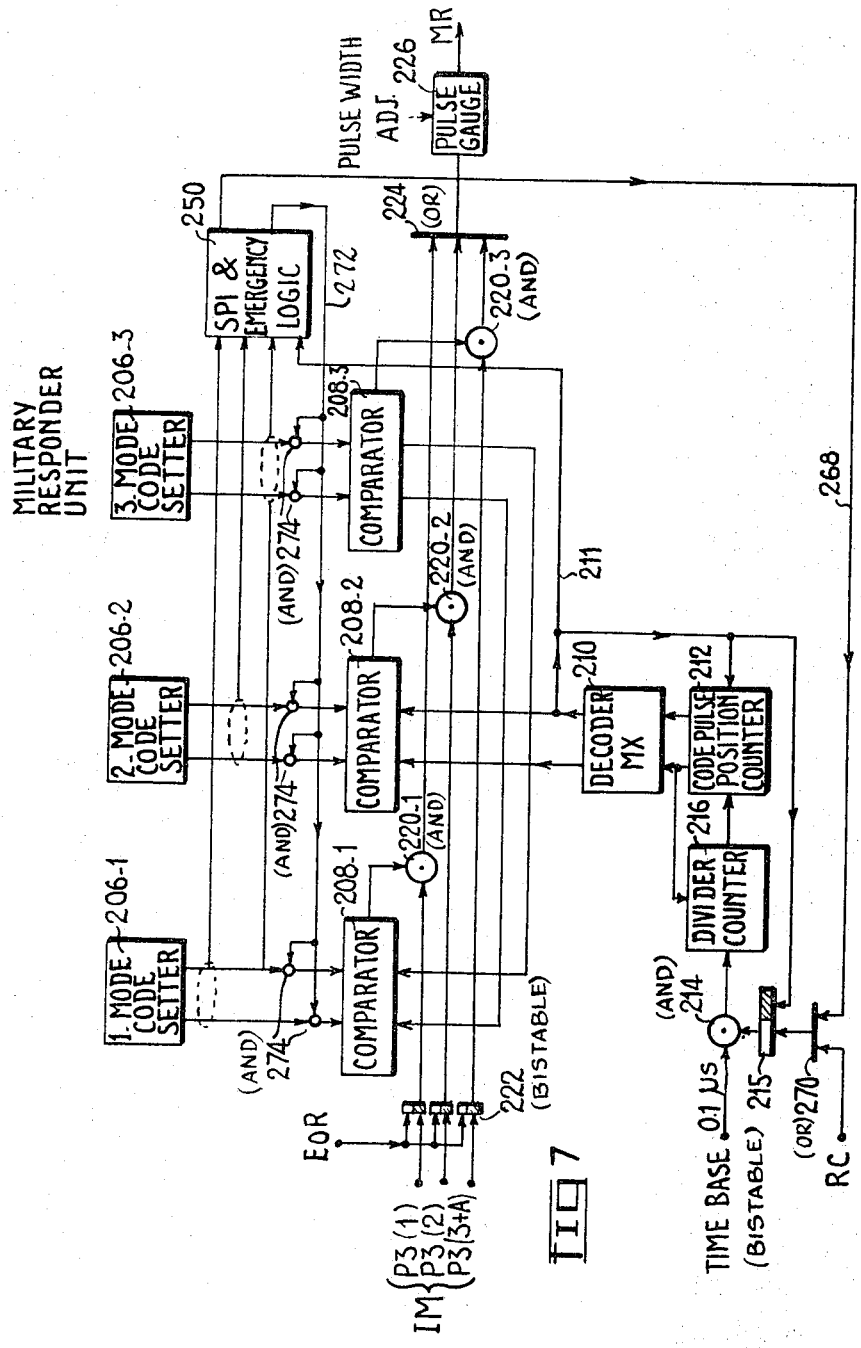

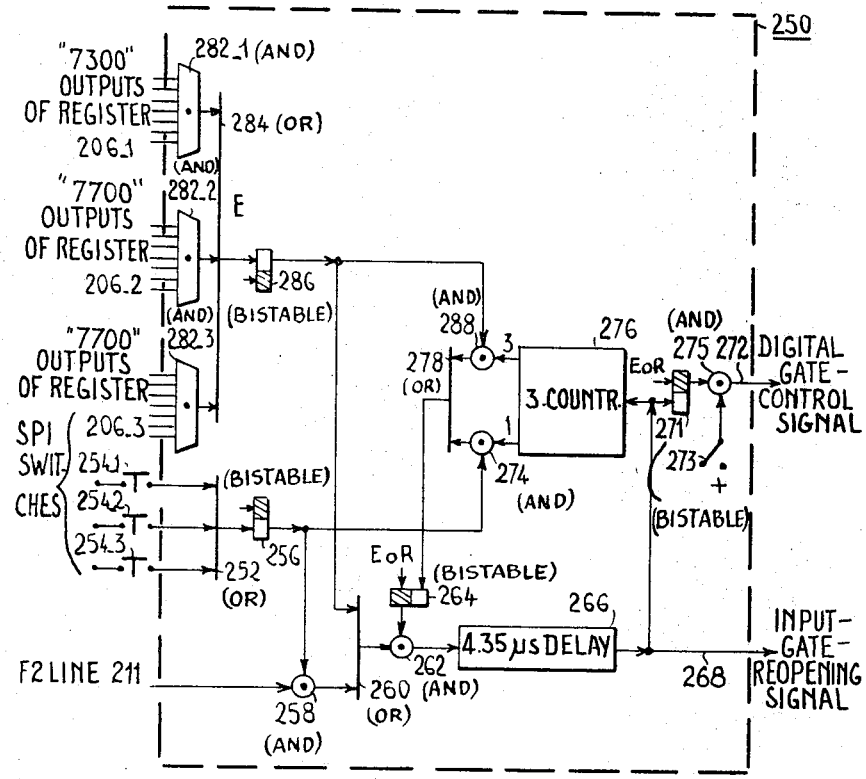

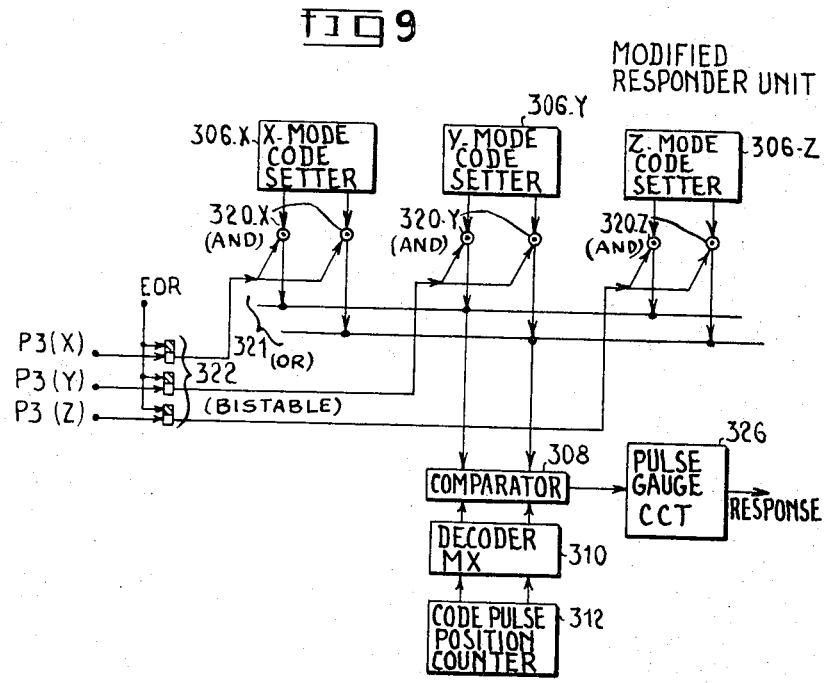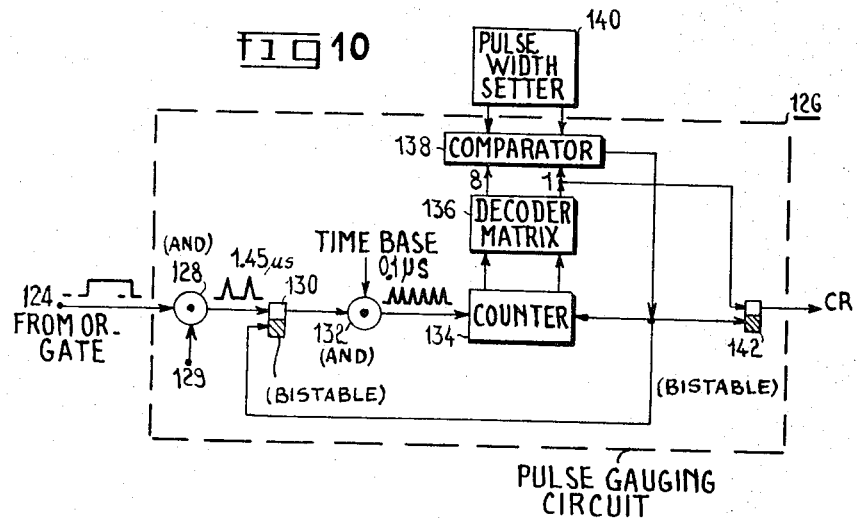

United States Patent Office 3,357,016
Patented Dec. 5, 1967

3,357,016
SECONDARY-RADAR RESPONSE SIMULATOR
Georges Peronneau, La Celle Saint Cloud, Serge Mikailoff, Paris, Félix Floret, Ste. Genevieve des Bois, and Paul L. Roman, Rueil-Malmaison, France, assignors to Societe Nouvelle d'Electronique et de la Radio-Industrie, Paris, France, a corporation of France
Filed Feb. 10, 1966, Ser. No. 526,437
Claims priority, application France, Feb. 10, 1965, 5,033, Patent 1,455,060
17 Claims. (Cl. 343—17.7)

ABSTRACT OF THE DISCLOSURE

Secondary-radar response simulator wherein response-command pulses (RC) are successively generated in consecutive major time periods representing successive sweeps of a simulataed radar antenna, the time position of each response-command pulse denoting azimuth and range of a simulated target, the occurrence of any response-command pulse triggering an associated responder unit (CIR or MIR) into emission of a multidigit code signal (FIG. 1a or 1b) from one of several individually presettable code registers (106 or 206) in that unit in accordance with the setting of a mode selector (TCM) channeling a trigger pulse to a selected code register. An automatic sequencer (20) may modify the operation of the mode selector during successive command cycles, and/or during successive sweep periods, in accordance with a predetermined but selectively variable pattern. The output of the responder unit may include a pulse shaper (126 or 226) for selectively altering, within predetermined limits, the width of the digital pulses representing the code signal of the responder.

---

This invention relates to apparatus for simulating response from radar targets, and its main object is to provide an improved radar response simulator useful in testing existing radar equipment, especially secondary-radar receiver and extractor equipment, in designing new equipment of that general class, and in training radar personnel.

The need for such a simulator has arisen owing to the great and growing complexity of present-day secondary-radar monitoring installations. So-called secondary radar monitoring systems (also known as air-traffic-control radar-beacon systems) have come into extensive use in recent years for controlling the heavy traffic of incoming aircraft over large airfields, both civil and military. Such systems serve to impart information to the ground control stations concerning each incoming craft about to land, over and above the sparse data given by the more conventional, so-called "primary" radar equipment. In a secondary radar system, the aircraft are equipped with transponders or beacons. When such an airborne transponder is irradiated with a radar beam from the ground-station interrogator, it automatically retransmits a response in the form of a digital code word which conveys certain specific items of intelligence concerning the carrier aircraft, primarily identification and altitude. The code used is a multipositional code. More precisely the code word currently in use has thirteen binary pulse positions. As used in civil aviation, one binary position is always blank, so that the word permits $2^{12}=4096$ binary combinations, whereas in military use all thirteen positions may be filled, yielding 8192 possible combinations. The code trains received at the ground station are passed from the receiver by way of an extractor unit to a decoder and the decoded information is displayed and used to perform control functions.

Objects of this invention include the provision of a simulator of great versatility and operating convenience having means for setting up the azimuth and range coordinates of at least one simulated target to produce a radar response at times accurately corresponding to the selected coordinates. Another object is to permit selection of the modes in which the simulated responses will be forthcoming. It should be understood in this connection that regulations currently in force admit of four different response modes in civil aviation use (the modes A, B, C and D) and three modes in military use (1, 2, 3), each mode specifying a particular type of information in the response code. The response mode is specified, upon transmission of the interrogation signal, as the variable spacing between two pulses composing the signal. The invention accurately simulates this type of operation. Further, current radar procedure provides for the possibility of automatically causing successive modes to follow one another in accordance with certain selectable sequences or time patterns. It is an object of this invention to provide a mode sequencer which will ensure this manner of operation in the improved simulator. Other objects include the provision of means for simulating such functions of real secondary radar systems as the so-called special identification (SPI) pulse, in the two different forms assumed thereby in civil and military radar work respectively, the emergency codes as used in military work and the use of composite codes such as the so-called Gilham code generally used in civil aviation for expressing altitudes.

Another important object of the improved simulator is the simulation of garbling situations. Such a situation can arise in practice whenever two or more target aircraft happen to be situated at different distances in substantially the same direction, so that the response code words from the respective craft, and/or the code positions therein, are liable to overlap, producing unintelligibility of one or both response codes. In a co-pending U.S. application, Ser. No. 498,829 filed October 20, 1965, three of us (F. Floret, S. Mikailoff and G. Peronneau) have disclosed an improved secondary-radar extractor system capable of dealing with such garbling situations more efficiently than could conventional equipment. The simulator of the present invention, in that it can be used to reproduce controllably any of the various garble configurations liable to occur in actual practice, will be invaluable in testing and investigating extractors of the above and analogous types.

The above and further objects of the invention are accomplished by the novel simulator according to our invention, one exemplary embodiment of which will now be described with reference to the accompanying drawing, wherein:

FIG. 7 is a functional diagram illustrating the Military Responder unit of the simulator shown in FIG. 2;

FIG. 8 is a logical diagram of a so-called SPI and Emergency Logic section forming part of the Military Responder of FIG. 7;

FIG. 9 is a fragmentary functional diagram of a modified version of the Responder units shown in FIGS. 5 and 7; and FIG. 10 is a diagram illustrating a Pulse Gauging Circuit usable in the Responder units of FIGS. 5, 7 or 9.

Figure 1A:
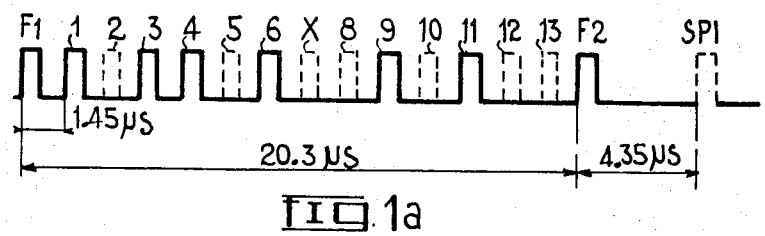
FIGS. 1a and 1b illustrate typical secondary-radar response code words as used respectively in civil aviation (I.C.A.O. specifications) and in military radar work.

An example of secondary-radar response code as given by a civil aircraft is shown in FIG. 1a. The code is seen to include a pair of framing or bracket pulses, i.e. a start pulse F1 and a stop pulse F2, having their leading edges spaced 20.3 µs apart. Between the framing pulses are thirteen pulse positions, defining fourteen pulse intervals 1.45 µs long (14×1.45=20.3 µs). Each pulse position other than the seventh may be occupied by a pulse or may be blank, thereby providing $2^{12}$ or 4096 different binary code combinations. The framing pulses F1 and F2 are of course always present, and the seventh pulse is always absent in the civil-aviation code. The pulse width may differ from one code to another from about 0.3 to about 0.7 µs. The code word indicated by way of example in FIG. 1a is seen to be 1011010010100. At a position three pulse intervals or 4.35 µs beyond the end framing pulse F2, a so-called special identification or SPI pulse may be present. This pulse is introducible manually by the aircraft operator in special circumstances on request by the ground authorities.

Figure 1B:
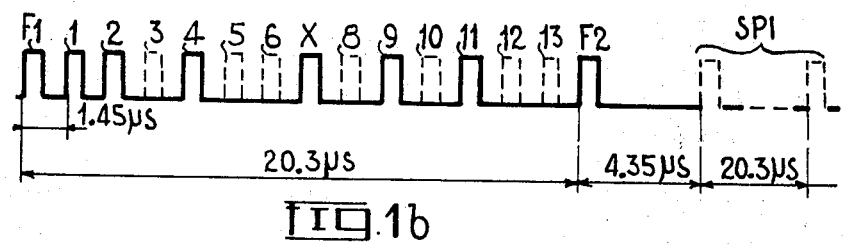

The military response code, an example of which is shown in FIG. 1b, differs from the civil aircraft code in the following particulars. The seventh (or "X") pulse can in this case be present, so that the total number of code combinations available for military identification purposes is $2^{13}$ or 8192 (rather than 4096). Special identification, where required, is proved as a pair of SPI pulses, the first being positioned three pulse intervals or 4.35 µs beyond the end framing pulse F2, and the second being positioned 14 pulse intervals (20.3 µs) beyond the first. The examplary code word shown in FIG. 1b is 1101001011000.

A civil, aircraft response may appear in any one of four different "code modes," A, B, C or D. The modes may have any of various significances in regard to the identification information provided by them. Mode C, however, serves to provide altitude information.

Figure 2:
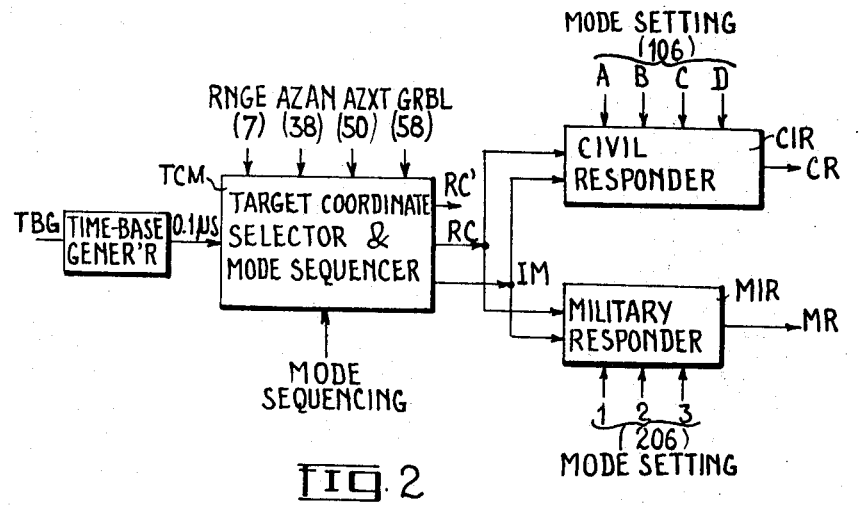
FIG. 2 is a synoptic diagram showing the broad layout of the improved simulator of the invention.

From the general layout diagram of FIG. 2, it will be seen that the simulator of the invention includes a Target Coordinate Selector and Mode Sequencer unit generally designated TCM having a Response Command output RC and an Interrogation Mode output IM, and two responder units each having two inputs connected in parallel to the RC and IM outputs of the TCM unit, the responder units including a Civil Responder CIR and a Military Responder MIR. The Civil Responder delivers responses at an output terminal CR and the Military Responder delivers responses at an output terminal MR, these responses being code words of the type described with reference to FIG. 1a and FIG. 1b respectively.

The operation of the machine is synchronized by means of fine clock pulses, here at a rate of 0.1 µs, delivered by a common Time Base generator TBG. Means are provided in the TCM unit for establishing a continuous series of major time-cycle periods and minor time-cycle periods. The major cycle periods simulate 360° azimuthal rotations of a radar-receiver antenna (antenna-rotation timing), and the minor cycle periods simulate successive ranging cycles produced at successive azimuths of the antenna, i.e. interrogation-repetition timing.

The TCM unit has a plurality of target-coordinate-selecting channels, respectively designated RNGE, AZAN, AZXT and GRBL, with corresponding registers 7, 38, 50, 58 described more fully hereinafter with reference to FIG. 3. The RNGE and AZAN channels can be operated, e.g. manually, to preset the range and azimuth angle of a simulated target, and in response to these settings a Response Command signal will appear at terminal RC at times corresponding to the times at which the responses from a target positioned at the preset range and azimuth coordinates would actually be received. More precisely, the AZAN setting determines the particular minor cycle period, or ranging cycle, within each major or antenna-rotation cycle, in which the RC signal occurs, while the RNGE setting determines the instant in the ranging cycle at which the RC signal occurs. The AZXT channel serves to preset so-called azimuth extent, that is to say the number of consecutive ranging cycles in which the RC signal is produced within every antenna-rotation cycle.

The GRBL channel is used when it is desired to simulate a garbling situation. This channel is used to preset the range coordinate of a second target having the same azimuth coordinate as the main target but a different range. In response to the GRBL setting, a garbling-response command signal can be made to appear at an auxiliary output terminal RC' a short adjustable time after the appearance of the main response command signal at terminal RC.

The TCM unit further includes a Mode Sequencing channel. This channel can be operated to preset a sequence of civil-interrogation modes A, B, C, D or a sequence of the military modes 1, 2, 3. In accordance with the preselected sequence, there will appear at the start of each successive ranging cycle a particular mode signal at the IM output, the signal identifying the mode in which the simulated target is supposed to respond (if at all) in that particular ranging cycle. Actually the IM output comprises a set of terminals associated with the respective modes, and a signal appears at the start of every ranging cycle at a particular one of the IM terminals to identify the desired mode.

The Civil Responder CIR has four Code Setter channels which can be separately operated to preset any one of the 4096 different code words (of the kind shown in FIG. 1a) in a respective one of the four civil modes A, B, C, D. Similarly the Military Responder MIR has three Code Setter channels operable to preset any one of the 8192 code words (of the kind shown in FIG. 1b) in a respective one of the three military modes 1, 2, 3. In the operation of the machine, in every ranging cycle that a Response Command signal appears at the RC terminal, a particular one of the four response code words preset in the Civil Responder, or of the three response code words preset in the Military Responder, is passed to the corresponding output, CR or MR, depending on the mode specified by the signal appearing at the IM terminals in the radial scan cycle considered.

The Target Coordinate Selector and Mode Sequencer unit TCM will now be described in detail with reference to FIG. 3.

In the TCM unit, the 0.1-µs clock pulses from the time-base generator TBG are applied to a range counter 2 forming part of the RNGE channel of the unit. Counter 2 has a counting capacity corresponding to the maximum ranging cycle of the simulated radar receiver, and such capacity is preferably made adjustable to increase simulation flexibility. Counter 2 may be a conventional binary counter having a plurality of outputs which are energizable in various binary combinations depending on the numerical content of the counter. It may here be noted that of the parallel output lines of counter 2 only the first and last ones are shown, and a similar convention is followed throughout the drawing to represent parallel output (and input) lines associated with other digital components of the system. The outputs of counter 2 are applied to the inputs of a conventional decoder matrix 4, which produces a voltage on a particular one of its parallel output lines corresponding to the voltage combination applied to the matrix from the counter 2. The parallel outputs of decoder matrix 4 are connected as inputs to one side of a comparator device 6, which may in the conventional manner comprise an array of coincidence (or AND) gates. The inputs at the opposite side of comparator 6 are connected to the outputs of the RNGE setting device 7. This is a multipositional digital setting device which will be more fully described later. When a selected number, indicative of the distance of a simulated target, has been preset in the register 7, the comparator 6 delivers an output pulse once per counting cycle of counter 2, i.e. once per simulated ranging cycle, as the digital quantity contained in counter 2 corresponds to the digital quantity preset in RNGE setter 7. The time of occurrence of the output signal from comparator 6, referred to the start of the counting cycle of the counter, therefore corresponds to the desired distance of the simulated target in accordance with the well-known ranging equation $D = \frac{1}{2}cT$, where D is target distance, c the velocity of electromagnetic waves and T the two-way propagation time of the waves. The output of RNGE comparator 6 is applied to one input of an AND-circuit 8.

Counter 2 can be reset to its initial condition indicative of the start of a ranging cycle (not the zero condition of the counter) in either of two ways. With a Reset switch 12 engaging a first reset terminal 14 (as shown in full lines), the counter is reset by an End-of-Range (or EoR) pulse occurring on the last output line of decoder matrix 4 connected to terminal 14. With switch 12 positioned in engagement with an external reset terminal 16, the reset pulses are applied from an external synchronization source, not shown, which may be a real radar transmitter set, for instance one being tested by the simulator described.

In accordance with standard secondary-radar practice, a pair of interrogation pulses is associated with the start of every radial scan cycle. The pair of interrogation pulses includes the so-called P3 pulse, which simultaneously serves to determine the start of the ranging cycle, and a so-called P1 pulse which acts as a gating signal and is positioned ahead of the P3 pulse by a variable time interval, this interval serving to characterize the particular mode A, B, C, D, 1, 2 or 3 in which the interrogated target is supposed to respond. The time interval is the same for the civil A mode and the military 3 mode.

The synchronizing and interrogation pulses P1 and P3 are derived through a set of lines generally designated 19 from appropriate outputs of decoder matrix 4 and applied (see FIG. 4) to an Interrogation Pulse Gauge circuit generally designated 20' which forms part of the Mode Sequencing section 20 of the TMC unit. In circuit 20' the initial P3 pulse and the variously timed P1 pulses preceding it are shaped and their width is adjusted to a prescribed value (e.g. from 0.3 to 0.7 μs) through conventional means not shown, which may be generally similar to the means used in the pulse-gauging circuit later described with reference to FIG. 10. Thus, circuit 20' produces on a first one of its outputs a gauged P3 pulse and on six other of its outputs gauged P1 pulses variably timed ahead of the P3 pulse by intervals serving to identify the various possible modes, i.e. modes 1, 2, 3 or A, B, C and D. In addition, circuit 20' develops from the appropriate output of matrix 4 a gauged pulse termed PA which is positioned a fixed interval of 28 μs ahead of the P3 pulse and serves to identify the serial number of each particular radial scan cycle within the azimuthal or sweep cycle, the latter thus constituting a major time period in comparison with the relatively short recurrence cycle of pulse P3 which selectively triggers the several code storers described hereinafter with reference to FIGS. 5 and 7.

As currently specified, the intervals from the P1 pulse to the P3 pulse have the following values in the respective modes:

| Mode: | P1–P3 interval, microseconds |
|---|---|
| A or 3 | 8 |
| B | 17 |
| C | 21 |
| D | 25 |
| 1 | 3 |
| 2 | 5 |

The utilization of the various signals produced by circuit 20' will be later described.

To preset the azimuth coordinate of the simulated responding aircraft, there is provided the azimuth-angle-selecting channel generally designated AZAN, which is broadly similar to the range-selecting channel RNGE described above. The AZAN channel includes an azimuth counter 22, which in one position (shown in full lines) of a switch 24 counts pulses applied thereto from an azimuth pulse generator 26. Every counting cycle of counter 22 represents a major time period, i.e. one 360° azimuthal revolution or sweep of the simulated radar antenna, and the generator 26 preferably has an adjustable pulse-generation rate, e.g. from 300 to 1000 c.p.s., to permit of simulating different antenna scanning rates, as from 3 to 10 r.p.m. In the alternative position of switch 24, shown dotted, counter 22 is connected to receive azimuth-angle signals from an external source, as will be later described more fully. Counter 22 further has a reset terminal 28 which when energized resets the counter to an initial state which determines the zero azimuth angle, i.e. a reference position in which, the simulated antenna is supposed to be pointing north. Reset terminal 28 can be connected by way of a two-positional switch to an internal-synchronization terminal 30, as here shown in full lines, or an external-synchronization terminal 32 as shown in dotted lines. When in the first position, counter 22 is reset every time it reaches a prescribed counting capacity. In the second position of the reset switch, the counter is reset on receiving an azimuth-synchronizing signal from an external source not shown.

Azimuth-angle counter 22 has its parallel outputs connected to the inputs of a decoder matrix 34, whose parallel outputs are connected with the inputs of an comparator network 36, the opposite inputs of which are connected to the azimuth-angle register 38 of the AZAN channel. Matrix 34, comparator 36 and setter 38 of the AZAN channel are generally similar in construction and operation of the corresponding components 4, 6 and 7 of the RNGE channel. It will, therefore, be understood that after the AZAN setter device 38 has been actuated, e.g. manually, to indicate a desired azimuth-angle, the AZAN comparator 36 will issue an output signal at that period, in every azimuth scan cycle counted out by AZAN counter 22, when the number of azimuth pulses counted out by the counter from its initial ("North") state corresponds to the preselected azimuth-angle or bearing indicated by AZAN setter device 3.

The output signal from AZAN comparator 36 is applied to one input of an AND-circuit 40 having its other input connected to receive the ranging-cycle or interrogation-synchronizing P3 pulses from circuit 20' or from an external synchronizing source (radar transmitter) as earlier described. The output from AND-circuit 40 is applied to a "setting" input of a binary element or bistable circuit 42. The corresponding ("set") output of binary 42 is connected to the second (upper) input of coincidence gate 8. The system as so far described operates as follows.

After a desired azimuth-angle and a desired target distance have been preselected on the AZAN and RNGE setter devices 38 and 7 respectively, RNGE counter 2 repeatedly counts out ranging cycles each comprising a number of 0.1-μs time-base pulses as determined by the effective capacity of the RNGE counter, and RNGE comparator 6 periodically delivers an output signal at a time, with each ranging cycle, representative of the preselected target range. The AZAN counter 22 similarly counts out a number of azimuth pulses corresponding to its capacity, and when the count in the AZAN counter equals the azimuth angle as preset on AZAN setter 38, AZAN comparator 36 delivers an output signal which conditions AND-gate 40 to pass the next P3 synchronizing pulse indicative of the start of a ranging cycle, this being the ranging cycle performed in the direction of the preselected azimuth-angle. The passed P3 pulse sets the binary 42 which thereupon energizes one (the upper) input of AND-gate 8. Therefore the first output signal from RNGE comparator 6 to occur in the set condition of binary 42 will be passed by gate 8 to appear as a Response Command signal pulse on the RC terminal.

In actual radar operation, owing to the finite angular extent or width of the radar beam, a given target will produce responses for all angular positions of the radar antenna within a certain finite angular range of the azimuth-angle coordinate, here called the azimuth-extent-angle. To simulate this situation in the simulator of the invention, there is provided the so-called "azimuth extent" or AZXT selector channel. The AZXT selector channel is generally similar in construction to the other selector channels described and includes a counter 44, decoder matrix 46, comparator 48 and digital setter device 50. AZXT counter 44 has its counting input connected to the output of AND-circuit 40 so as to count the P3 interrogation-synchronizing pulses passed by that circuit and has a reset terminal 51 energized from decoder matrix 46. As will be understood from the description of the other selector channels, AZXT compartor 48 produces an output signal whenever AZXT counter 44 has counted a number of P3 pulses effectively passed to binary 42 corresponding to the azimuth-extent angle preset (manually or otherwise) by means of AZXT register 50. The output signal from AZXT comparator 48 is applied to the resetting input of binary 42, resetting the binary and cutting off the enabling voltage applied to the upper input of coincidence gate 8.

With this arrangement, it will be evident that response command signals will appear at the RC terminal within each of a finite number of consecutive ranging cycles, as determined by the setting of AZXT setter 50, thereby simulating the repeated responses from a real target due to the finite width of a radar beam as explained above.

Another condition that often occurs in real radar operation is the garbling of response due to the simultaneous presence of more than one target at positions such as to be simultaneously scanned by the radar beam. In such cases the response codes from the targets can be variously timed with respect to one another so as to produce various configuration patterns as between the pulse positions of the respective codes. This leads to difficulties in that the code-extractor section of the radar system will not always be able to extricate the response codes from one another, i.e. garbling will be present. In the aforementioned copending patent application Ser. No. 498,829 there is disclosed an improved secondary-radar code-extractor capable of discriminating between various types of signal-garbling situations and successfully extracting useful, i.e. decodable, signals from among other, garbling signals in a number of situations. To permit of testing code extractors of the general type disclosed in that copending application, and for other analogous purposes, the present simulator has means for simulating the presence of at least one additional target within the same azimuth-extent angle as the main simulated target, at a simulated distance that can be selectively preset with respect to the simulated distance of said main target.

For this purpose, as shown, there is provided the so-called garbling channel GRBL which, like the other selector channels described, includes a counter 52, decoder matrix 54, comparator 56 and digital setter 58. The GRBL counter 52 has a counting input connected to receive 0.1-$\mu$s time-base pulses from the common time-base generator TBG, and having a reset input connected to the output of coincidence gate 8. GRBL counter 52, therefore, will start out to count 0.1-$\mu$s time-base pulses every time a Response Command signal is emitted on RC terminal. When GRBL counter 52 has counted a number of 0.1-$\mu$s pulses corresponding to the setting of GRBL setter device 58, GRBL comparator 56 emits an output signal which is applied to an auxiliary or garbling Response Command terminal RC'. The capacity of GRBL counter 52 is made large enough to make possible a maximum time interval between the Response Command signals appearing at the respective terminals RC and RC', at least equal to the time duration of a response code, i.e. about 25 microseconds. Since the GRBL register 58 makes it possible to vary the relative timing between the two Response Command signals by increments of 0.1 microsecond, it will be seen that the arrangement described will permit of simulating any desired garbling configuration that is liable to occur between targets at different distances from the radar monitor system, including the configurations described as "Interleaved Garbling" and "Phase Garbling" in the afore-mentioned copending patent application.

Figure 3:
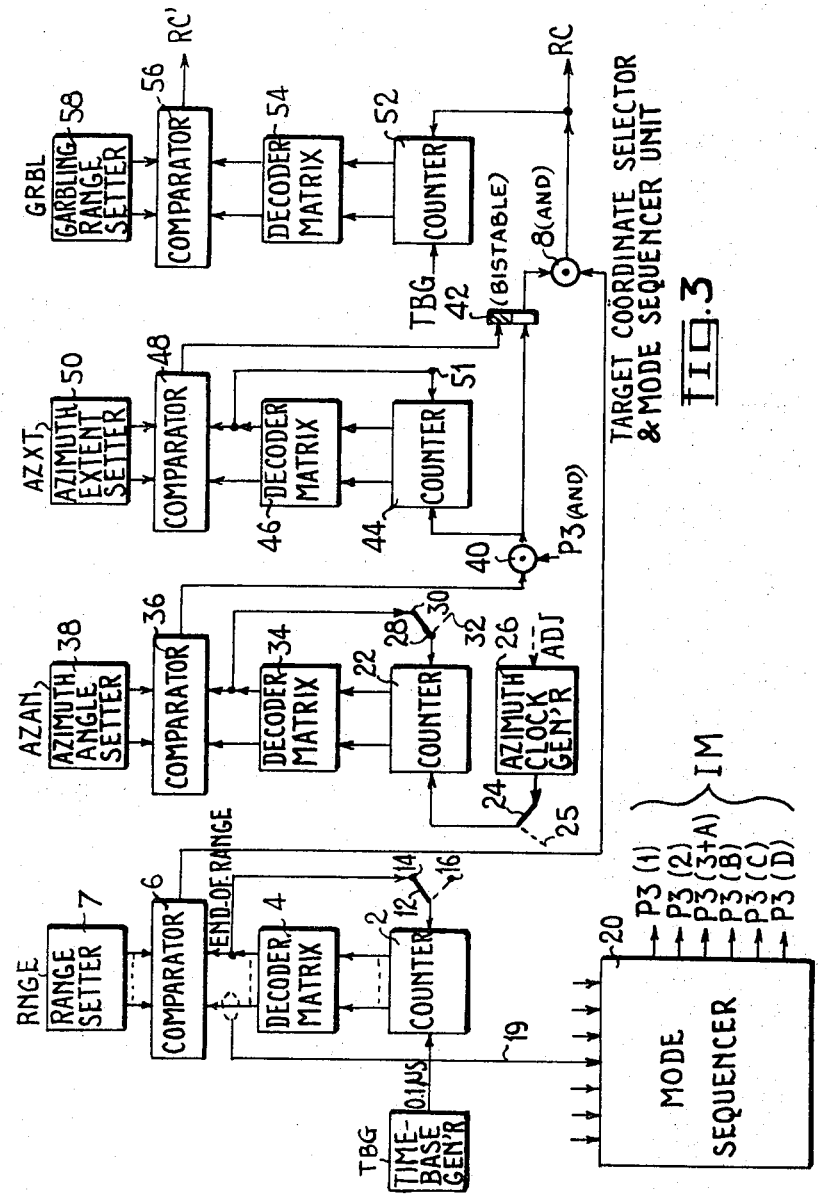
FIG. 3 is a functional diagram illustrating the Target Coordinate Selector and Mode Sequencer unit of the simulator shown in FIG. 2.

While the system shown in FIG. 3 has means for simulating but a single additional ("garbling") target, it is evident that any number of such additional targets can easily be simulated by simply providing an additional GRBL setter device similar to device 58 and an additional GRBL comparator similar to comparator 56 for each additional target to be simulated, each such additional GRBL comparator having one side connected to the GRBL decoder matrix 54, shown in FIG. 3, in parallel with comparator 56.

Further, the apparatus shown in FIG. 3 can very readily be expanded to provide for the simulation of additional targets differing in azimuth and/or range coordinates from the coordinates of the main simulated target. For such purpose, it is simply necessary to provide an additional comparator and an additional setter for each desired additional target, in the azimuth-angle, extent and/or range selector channels shown, while using the same counters and decoder matrices as those provided for the main simulated target, as shown in FIG. 3. The outputs from such additional comparator or comparators would be used to develop one or more additional Response Command signals occurring in sequential relation with the main Response Command signal.

In current secondary-radar monitoring procedure, provision is made for automatically sequencing the interrogation modes during transmission, in a number of selected sequences or programs. Specifically, any desired threesome of interrogation modes, such as ABC, BAC; 123, 213, A12, and so forth, can be preselected, whereupon the selected sequence of interrogation modes will be repetitively transmitted in the successive ranging cycles. It is recalled that each interrogation mode is identified as a particular time interval between the synchronizing pulse (here called P3), marking the start of a ranging cycle, and another pulse (P1) preceding the P3 synchronizing pulse. Further, provision is made for changing the selected sequence to another selected sequence, at the end of each of three consecutive 360° antenna rotation cycles, such change in mode sequence however involving only a change in the third mode of the above-mentioned threesome. In other words, provision is made for a minor sequence, which is a sequence of (at most) three modes, and a major sequence, which is a sequence (at most) three mode sequences. The full minor sequence repeats every three ranging cycles, and the full major sequence repeats every three 360° antenna-rotation cycles. The Mode Sequencer section will now be described in detail.

The Mode Sequencer includes (FIG. 4) a Ranging Cycle Counter 60 and associated decoder matrix 62 and an Antenna Rotation Cycle Counter 64 and associated decoder matrix 66. Counter 60 has its counting input connected to receive PA pulses from circuit 20' which pulses as earlier indicated each appear a fixed interval of time, herein 28 $\mu$s, before the start of every ranging cycle. Counter 64 has its counting input connected to receive a pulse at the start of each antenna-rotation cycle, and for this purpose the input of counter 64 is shown connected through a switch, which may be common or ganged with switch 28, to either of the two terminals 30, 32 which serve to reset the AZAN counter 22 as earlier described.

Each of the Cycle Counters 60 and 64 has a total counting capacity of three, each being for example a two-stage binary counter with one binary combination unused. The effective counting capacity of each of the counters 60 and 64 can be selected at any one of the values one, two and three. For this purpose, as shown, there is provided a respective three-positional switch 68, 70 for selectively connecting the reset input of counter 60 or 64 with any one of the three output lines of the associated decoder matrix 62 or 66. The three output lines of matrix 62 are designated $a1$, $a2$, $a3$ and those of matrix 64 are designated $b1$, $b2$, $b3$. With this arrangement, considering for example Ranging Cycle counter 60 and matrix 62, with switch 68 positioned on its "1" contact the counter 60 will be reset to zero every time matrix output $a1$ is energized, that is to say just prior (by 28 $\mu$s) to the start of every ranging cycle. With switch 68 positioned on it "2" or "3" contact, counter 60 will be reset to zero every time the respective matrix output $a2$ or $a3$ is energized, that is to say just prior to the start of every other or every third ranging cycle, respectively. Similarly, counter 64 is reset to zero on energization of matrix output $b1$, $b2$ or $b3$, i.e. 28$\mu$s ahead of every single, every other, or every third full antenna-rotation cycle, according as switch 70 is positioned in its "1," "2" or "3" contact position. A delay circuit (not shown) may be interposed in the reset connection of each of the counters 60, 64 to ensure that the counter is not reset before all of the synchronizing pulses relating to the ranging cycle under consideration have effectively occurred.

Five similar arrays of AND-gates, six gates per array, are provided, the arrays being designated 88, 90, 92, 94, 96. In each array, the AND-gates have their first inputs connected to respective ones of the six "P1" outputs of circuit 20', i.e. the output lines transmitting the six time-displaced mode-identifiying pulses P1(1), P1(2), P1(3+A), P1(B), P1(C) and P1(D). The AND-gates in each array have their second inputs connected to respective contacts of an associated six-positional switch, the switches being designated 76, 78, 80, 82, 84. The movable contacts of switches 76 and 78 are connected to the $a1$ and $a2$ outputs of the decoder matrix 62 associated with Ranging Cycle counter 60. The movable contacts of switches 80, 82 and 84 are connected to the $b1$, $b2$ and $b3$ outputs of the decoder matrix 66 associated with the Antenna Rotation Cycle counter 64 by way of respective AND-gates 86 each having an enabling input connected to the $a3$ output of the decoder matrix 62.

Figure 4:
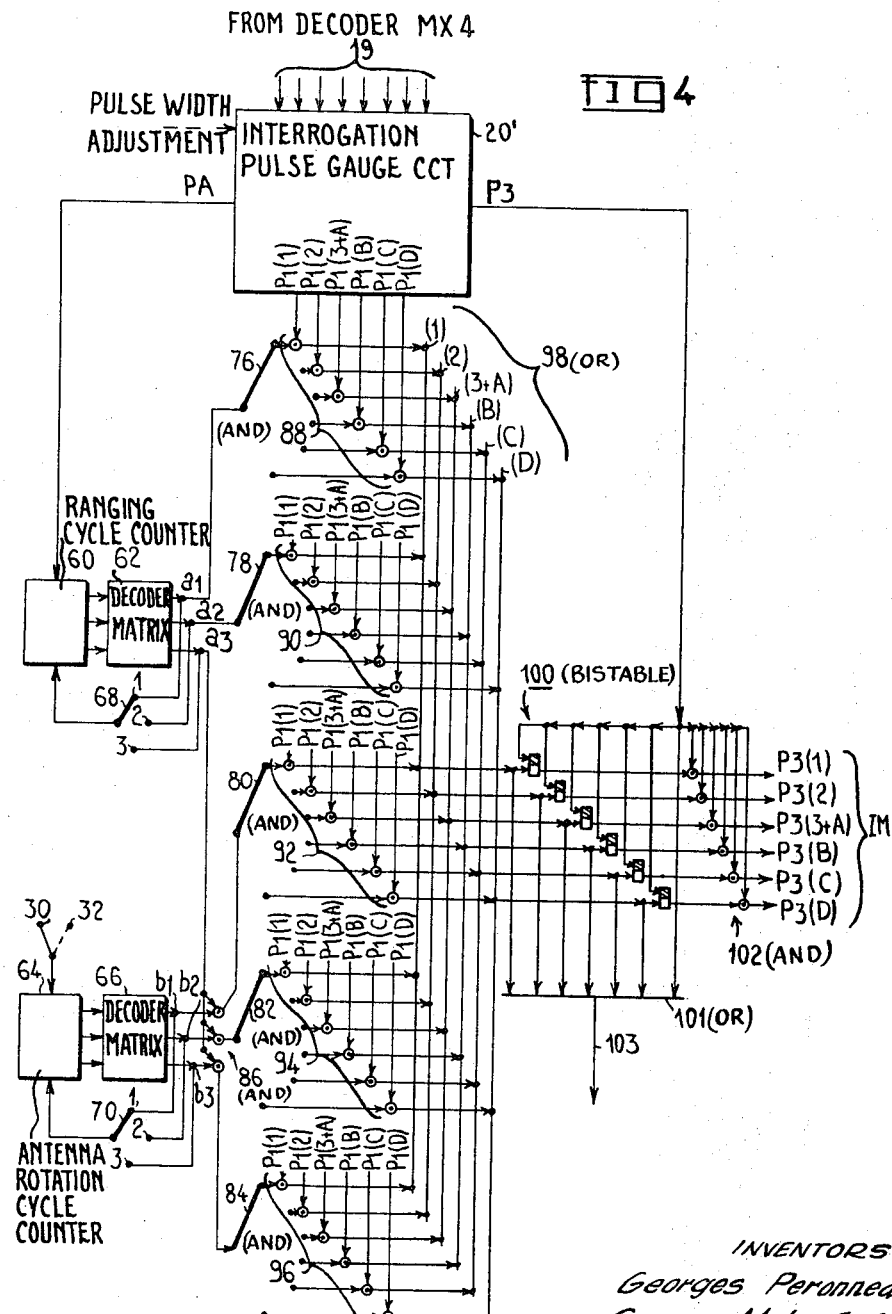
FIG. 4 is a more detailed logical diagram of the Mode Sequencer section of the unit shown in FIG. 3.

In the ensuing description the AND-gates in each of the five arrays 88 through 96 will be individually identified by the array number followed by the bracketed indication of the particular interrogation mode (1, 3, 3+A, B, C or D) whose characteristic P1 pulse is connected to that gate. A similar scheme is used to identify the contacts of switches 76 through 84. Thus, the lowermost AND-gate in FIG. 4 is gate 96(D), and the lowermost switch contact is 84(D).

Corresponding AND-gates in the five arrays 88–96 have their outputs connected to respective inputs of an associated five-input OR-gate, the OR-gates being collectively designated 98 and individually identified by the associated interrogation modes. The outputs of the six OR-gates 98 are connected to first ("setting") inputs of respective binaries or two-state elements collectively designated 100. The "set" outputs of the binaries are applied to first inputs of respective AND-gates collectively designated 102, all having their second inputs connnected to receive the ranging cycle synchronizing pulse P3. This same pulse is also applied to the resetting inputs of binaries 100. The outputs from AND-gates 102 constitute the six output lines P3(1), P3(2), P3(3+A), P3(B), P3(C), P3(D) of the Mode Sequencer section, which outputs are collectively designated IM as in FIGS. 1 and 2. The Mode Sequencer section, which outputs are collectively designated IM as in FIGS. 1 and 2. The Mode Sequencer operates as follows.

When switch 68 is positioned on it "1" contact, matrix output line $a1$ is energized at the start of each consecutive ranging cycle, the other matrix outputs ($a2$, $a3$, $b1$, $b2$ and $b3$) remaining at all times deenergized. In this condition, it is evident that moving switch 76 to any one of its six contact positions will cause a corresponding P1 pulse to be passed by a gate 88 and a gate 98 to set a corresponding one of the binaries 100 at the start of each consecutive ranging cycle, and the setting of that binary will cause the ranging-cycle-synchronizing pulse P3 to appear on a corresponding one of the output lines IM at the start of each consecutive ranging cycle. Thus, with switch 68 in its "1" position, if switch 76 is moved to contact position 76(B), for example, then at the start of each consecutive ranging cycle the P3 pulse will appear on output line P3(B), indicating that a response in the civil mode B is awaited from the Civil Responder unit CIR at every ranging cycle.

It will similarly be seen that with switch 68 in the "2" position, matrix output lines $a1$ and $a2$ will be energized at the start of alternate ranging cycles, matrix output $a3$ remaining deenergized. By placing both switches 76 and 78 in respective, selected contact positions, the respective P1 pulses thus selected will be passed on alternate cycles by the corresponding AND-gates of the respective arrays 88 and 90 and through respective OR-gates 98 to set respective ones of the binaries 100 and the alternate setting of these binaries will cause the P3 pulses to appear on two corresponding output lines IM at the start of said alternate ranging cycles. For example, with switch 68 in its "2" position, if switches 76 and 78 have the settings 76(B) and 78(C) respectively, then the output lines P3(B) and P3(C) will be energized at the start of alternate ranging cycles, indicating that responses in the civil modes B and C are alternately awaited from the Civil Responder unit.

When switch 68 is placed on its "3" contact, the full minor sequence of three consecutive interrogation modes is available. As earlier indicated, the third and last mode of such a threesome can be selectively altered over a major sequence of three consecutive antenna, rotation cycles. It is to make this type of operation possible that the Antenna Rotation Cycle counter 64 and associated circuitry is provided. With switch 68 in the "3" position, switch 70 can be placed in its "1," "2" or "3" position in order to provide, respectively, for a single minor sequence of three interrogation modes in all successive antenna, rotation cycles, or two different minor sequences, differing only in the last of the three modes of the sequence, alternating in successive antenna, rotation cycles, or finally the full complement of three minor sequences (i.e. a full major sequence), said three minor sequences differing only in the last of the three modes of the sequence, with the three sequences regularly following one another in successive antenna cycles.

To facilitate understanding of the operation of the Mode Sequencer, a specific example will be given for the case where both switches 68 and 70 are placed in their "3" positions, thereby making available the full range of sequencing possibilities provided for. It is assumed that the simulator is to be operated for military radar work, and that the switches 76 through 84 are adjusted to the following contact positions:

76(1), 78(2), 80(1), 82(2), 84(3)

It is then readily verified, in the light of the explanations earlier given, that the sequencing of the P3 pulses between the IM output lines at the start of successive ranging cycles will proceed in such a manner, shifting between the output lines P3(1), P3(2) and P3(3), that the following overall sequence of response modes will be specified for the Military Responder unit MIR:

```
1st Antenna-Rotation Cycle: 1 2 1   1 2 1
2nd Antenna-Rotation Cycle: 1 2 2   1 2 2    } Major Sequence, 1st Occurrence
3rd Antenna-Rotation Cycle: 1 2 3   1 2 3

4th Antenna-Rotation Cycle: 1 2 1   1 2 1
5th Antenna-Rotation Cycle: 1 2 2   1 2 2    } Major Sequence, 2nd Occurrence
6th Antenna-Rotation Cycle: 1 2 3   1 2 3
``` and so on, the same Major Sequence being repeated indefinitely.

The Mode Sequencer described has been developed to satisfy certain specifications currently in force for civil and military radar monitors, but it will be understood that it can serve for different specifications with only minor modifications in the circuitry shown. Thus, in some cases the Antenna Rotation Cycle counter 64 and associated circuits may be omitted; the maximum capacity of each of the Cycle Counters 60 and 64 may be made less or more than three, all depending on the complexity of the interrogation mode sequences or time patterns that may be desired. Furthermore, in cases where the simulator of the invention is used with external synchronizing means as earlier indicated, the Mode Sequencer can be entirely omitted or disconnected and the IM terminals may be connected with an external synchronizing terminal at which the P3 pulses would be delivered with the proper timing from the external synchonizing means, such as a radar transmitter not shown.

Also shown in FIG. 4 is an OR-gate 101 which has its inputs connected to receive the outputs of all the OR-gates 98 and the P3 pulse from Pulse Gange Circuit 20', so as to deliver at its output 103 the interrogation-mode pulses in serial form. This auxiliary output of the Mode Sequencer may serve various useful functions, not here described. It will be understood that the switches shown in FIG. 4, and any or all of the remaining switches referred to, while shown as mechanically rotatable contact switches, may assume the form of electronic switching means.

The Civil Aviation Responder unit CIR will now be described with reference to FIG. 5. This unit includes four digital code storers comprising respective registers 106A, 106B, 106C and 106D which can be independently actuated, e.g. manually, for presetting therein desired response code words in each of the four respective modes used in civil aviation, i.e. the A, B, C and D modes. A civil response code, as will be recalled, can consist of up to twelve code pulses included between the start and stop framing pulses F1 and F2, the code pulses being positioned and dimensioned in the manner explained earlier with reference to FIG. 1a. The "C" mode differs from the remaining three civil modes in certain particulars. This is an altitude-indicating mode, and the responses given in this C mode are coded in a special manner known as the Gilham code. Accordingly, a so-called Gilham code converter 107C, later described in detail, is interposed in the output of the mode-C code setter 106C.

The parallel digital outputs from each of the three code setters 106A, 106B and 106D and Gilham code converter 107C are connected to one side of respective comparator circuits 108A, 108B, 108C and 108D. The opposite input sides of the comparators are connected in parallel with the outputs of a common decoder matrix 110 having its input connected to respective outputs of a pulse-position counter 112. This counter is arranged to count 1.45-μs pulses (1.45 μs being the interval between pulse positions of the response code as shown in FIG. 1a), starting with the delivery of a Response Command signal at the RC terminal of the Coordinate Selector and Mode Sequencer unit TCS.

To ensure this type of operation of pulse-position counter 112, the 0.1-μs time-base pulses from time-base generator TBG are applied to one input of an AND-gate 114 having its other input connected to the set output of a Response Command binary 115 whose setting input is connected to the RC terminal. The output of gate 114 is applied to a divider counter 116 arranged to deliver an output pulse every 14½ input pulses of every 1.5 μs. The output pulses from counter 116 are applied to the counting input of Code Pulse position counter 112.

Counter 112 has a capacity somewhat greater than the seventeen pulse intervals corresponding to the total length of the response code including the SPI pulse optionally present. An end output of decoder matrix 110, positioned beyond the output corresponding to the timing of the SPI pulse, serves as a reset line 111 connected to the reset input of counter 112, and also connected to the reset input of binary 115.

As will be readily understood, each of the comparators 108A, 108B, 108C and 108D delivers an output pulse whenever Code Pulse Position counter 112 passes through a count, in its counting cycle, that corresponds with a "1" digit position introduced into the associated Code Setter device 106A, 106B, 106C or 106D. The outputs from the comparators 108A, 108B, 108C and 108D, are applied to first inputs of corresponding AND-gates 120A, 120B, 120C and 120D.

Figure 5:
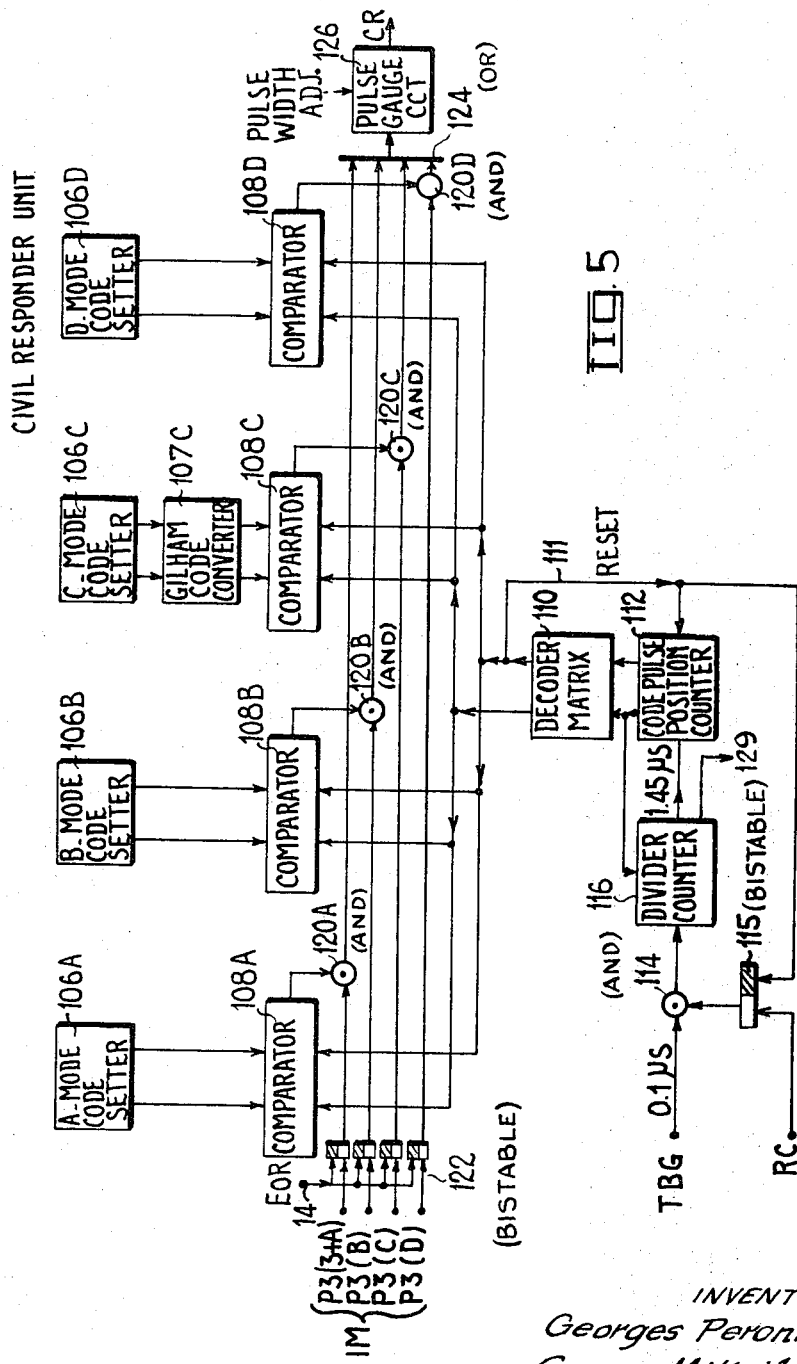
FIG. 5 is a functional diagram illustrating the Civil Responder unit of the simulator shown in FIG. 2.

Shown in FIG. 5 are those four IM output terminals of the aforedescribed Mode Sequencer section that are involved in the operation of the Civil Responder unit, i.e. terminals P3(A+3), P3(B), P3(C) and P3(D). The four terminals are connected to the setting input of respective binaries 122. The binaries have resetting inputs connected to receive the EoR (End-of-Range) signal from terminal 14. The set outputs of binaries 122 are respectively connected to second inputs of the AND-gates 120A, 120B, 120C, 120D. The outputs of the AND-gates 120A through 120D are applied to the inputs of an OR-gate 124. The output of the OR-gate is applied to a Pulse Gauging circuit 126 (later described) in which the output pulses are reshaped and their pulse width is adjusted to a prescribed value. The output of circuit 126 constitutes the CR output terminal of the Civil Responder.

To review the operation of the Civil Responder as so far described, it will be seen that, at the start of any ranging cycle, one of the four IM lines is energized by a trigger pulse P3 as the result of the operation of the Mode Sequencer section earlier described, and thereby sets a corresponding one of the binaries 122. The output of the set binary enables the associated AND-gate 120A through 120D. If the ranging cycle considered is one in which the presence of a target is indicated (as a result of the setting of the AZAN and AZXT channels of the TCS unit), then a Response Command signal will appear at the RC terminal, at a certain instant in the ranging cycle as determined by the presetting of the RNGE channel of the TCS unit. The occurrence of the Response Command signal sets binary 115 and thereby enables gate 114 to pass time-base (0.1 μs) pulses to counter 116, whereupon Code Pulse Position counter 112 begins to count out 1.45-μs pulses. Every time the counter 112 reaches a count that corresponds to a 1-digit setting in the response codes as preset in any one of the Code Setter devices 106A, 106B, 106D, the associated comparators 108A etc. produce output pulses. However, only the output pulses from that comparator whose associated AND-gate 120A etc. has been enabled at the start of the ranging cycle from an IM binary 122 is allowed to pass through the enabled AND-gate to the OR-gate 124 and appears, after reshaping and gauging in pulse-shaping circuit 126, at the CR terminal. Thus the CR terminal delivers the response code word in the requisite mode as called for by the operation of the Mode Sequencer unit, said response code word having the character preselected by means of the corresponding Code Setter device 106 and appearing at the CR terminal at the instant corresponding to the range of the simulated target as preselected by means of the RNGE channel of the TCS unit, shown in FIG. 3.

The Pulse Gauge Circuit 126 is shown in greater detail in FIG. 10. The pulses issuing from OR-gate 124 are applied to an AND-gate 128 which has a second input connected to receive spike pulses at a rate of 1.45 $\mu s$ from a dephased output terminal 129 of divider counter 116. The output of gate 128 is applied to the setting input of a binary 130 whose output thereupon enables a coincidence gate 132 to pass 0.1-$\mu s$ time base pulses to a counter 134. Thus gate 132, when enabled, passes trains of 0.1-$\mu s$ pulses to counter 134, the initial 0.1-$\mu s$ pulse of each train being substantially time-coincident with the leading edge of a 1.45-$\mu s$ pulse from OR-gate 124. Counter 134 may conveniently have a counting cycle of eight, and the decoder matrix 136 connected to the counter output would accordingly have eight output lines 1 . . . 8 which are connected to one side of a comparator circuit 138. The other side of the comparator is connected to the output of a digital Pulse-width Setter device 140. Device 140 may be settable to any one of the five digital quantities from 3 through 7. The "1" output line of decoder matrix 136 is applied to the setting input of a binary 142, and the output of comparator 138 is applied to the resetting input of the binaries 130, 142, as well as to the reset input of counter 134.

The circuit described operates as follows. Every incoming pulse from OR-gate 124 acts, by way of gate 128, binary 130 and gate 132, to initiate a train of fine 0.1-$\mu s$ pulses and these pulses are counted by counter 134. The initial pulse of the train, as it appears on the "1" output of the decoder matrix 136, sets the binary 142, whereupon the binary produces a voltage on the CR output terminal. When the counter 134 has counted out a number of 0.1-$\mu s$ pulses equal to the quantity, from 3 through 7, preset by means of the pulse-width-setter device 140, comparator 138 emits an output which resets the binary 142, terminating the output voltage pulse on the CR terminal. This output pulse, therefore, is seen to possess an accurately determinable time duration or width of 0.3 to 0.7 $\mu s$, as preset by means of the pulse-width-setter device 140.

The Gilham Code Converter section 107C of the Civil Responder unit CIR will now be described with reference to FIG. 6. A summary description of the Gilham code to the extent necessary for the understanding of the apparatus will first be given. The code is used to convey altitude information and is a hybrid binary code wherein a code word includes an upper or more significant section giving altitude values in increments of 500 feet and coded in the reflex binary code, and a lower section giving values in 100-feet increments coded in another suitable cyclic binary code. The respective characteristics and advantages of the various types of binary code are well known in the field of data processing and will not be entered into since they can be found in any suitable textbook.

Figure 6:
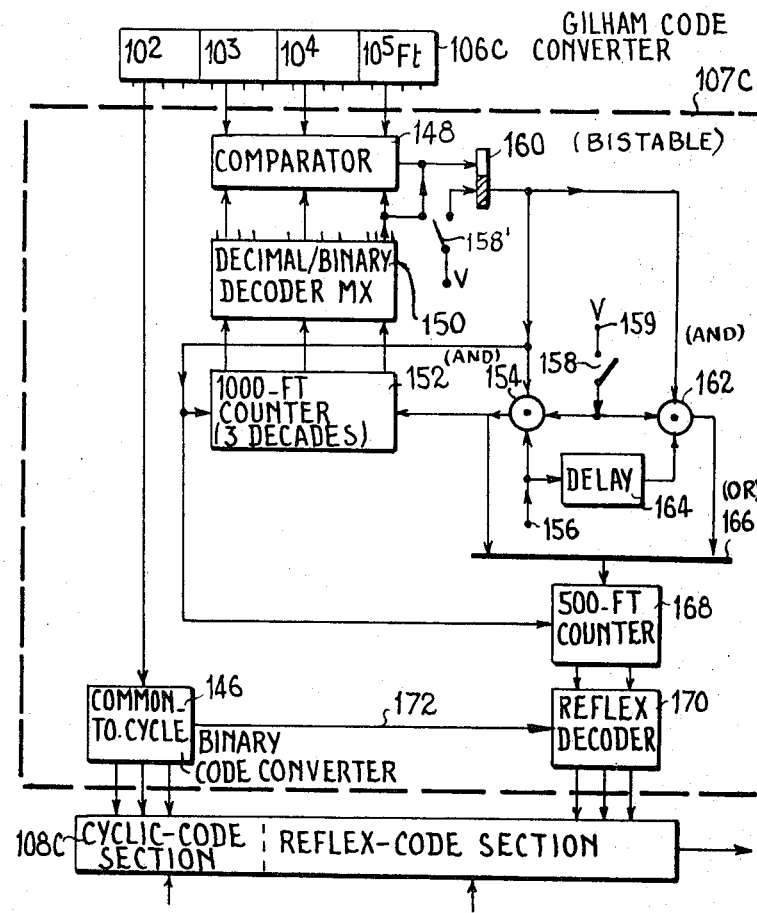
FIG. 6 is a logical diagram of a so-called Gilham Code Converter forming part of the Civil Responder of FIG. 5.

As shown in FIG. 6, the C-mode digital Code Setter 106C is a four-stage decimal register permitting convenient setting up of altitude values in increments of 100 feet up to more than 100,000 feet. Each of the four decimal stages of the register is arranged to deliver an output in binary coded from, and hence each stage output should be considered as including four parallel lines, although only one is shown. It may here be noted that the remaining Code Setting devices 106A, 106B and 106D are preferably also constructed as decimal registers with binary-coded outputs.

The lowermost ("100 ft.") stage of register 106C is connected by way of a straight-binary-to-cycle-binary converter network 146 with a corresponding lower section of comparator 108C, so as to apply the decimal, binary-coded 100-ft. digit of the preset altitude value to the corresponding stages (the three lowermost stages) of comparator 108C in a cyclic binary notation in accordance with the requirements of the Gilham code noted above.

The upper three stages of Setting Register 106C, which deliver decimal binary-coded digits indicating thousands, ten-thousands and hundred-thousands of feet, are connected to corresponding input stages at one side of a binary comparator circuit 148. The opposite input side of comparator 148 is connected to the output of a decoder matrix 150 whose input is connected to the output of a so-called 1000-ft. counter 152. Counter 152 may be a three-decade decimal counter, and matrix 150 may be a decimal-to-binary converter matrix.

Means are provided for feeding counting pulses to the 1000-ft. counter 152 in an amount corresponding to the number of thousands of feet preset in register 106C. There is for this purpose provided an AND-gate 154 having one of its inputs connected through a terminal 156 to any suitable source of counting pulses which may be of relatively low frequency. Another input of gate 154 is connectable to a voltage V on a terminal 159 through a manual switch 158, and a third input of gate 154 is connected to the reset output of a binary 160 having its setting input connected to the output of comparator 148. With this arrangement it will be seen that on closure of manual switch 158, counting pulses from terminal 156 will be applied to counter 152 in a number corresponding to the number of 1000-ft. increments contained in the altitude setting in register 106C. When this number has been reached, comparator 148 emits an output which sets binary 160 and thereby disables the gate 154. The 1000-ft. counter 152 is simultaneously reset by the trailing edge of the signal from binary 160. Binary 160 may have its setting input connected as shown to the last output of decoder matrix 150; this prevents overloading in the event that decoder matrix 150 goes to a full count.

The Gilham code, as will be recalled, requires that the mode-C altitude word indicates in its upper sections 500-ft. increments of altitude, not 1000-ft. increments, and that the 500-ft. increments are coded in reflex binary.

There is accordingly provided a second AND-gate 162 which has one input connected to the counting-pulse-source terminal 156 through a delay device 164 which imparts to the counting pulses from terminal 156 a delay equivalent to about one half the interval between the counting pulses. Gate 162 has another input supplied from the energizing terminal 159 through the aforementioned manual switch 158, and a third input connected to the reset output of binary circuit 160. The outputs from both AND-gates 154 and 162 are applied to the inputs of an OR-gate 166. It will be seen that the pulse-splitting arrangement including delay device 164 ensures that, on closure of manual switch 158, there appears at the output of OR-gate 166 a number of pulses twice the number of the counting pulses applied to 1000-ft. counter 152; hence each of the pulses appearing at the output of OR-gate 166 will represent a 500-ft. increment of the altitude value preset in register 106C.

The pulses from OR-gate 166 are applied to a so-called 500-ft. counter 168. The counter output is applied to a decoder matrix 170 which functions to decode the numerical contents of the 500-ft. counter 168 directly in the reflex binary code. The outputs of matrix 170 are connected to the appropriate binary stages of comparator 108C. The 500-ft. counter 168 has a reset inut connected to the reset output of binary 160 as is also true of the 1000-ft. counter 152. The reset input of binary 160 is also shown to have the voltage source V connected to it through switch 158'; it is evident that this connection will have to be of such a nature as to allow for a reopening of gates 154, 162, together with a resetting of counters 152, 168, whenever it is desired to alter the code stored in register 108C. Further, in accordance with a secondary feature of the Gilham code, means are provided in the decoder matrix 146 for adding an amount of 2, 3 or 4 into the 500-ft. counter 168 depending on the parity of the decimal digit in the 100-ft. stage of register 106C. This expedient, which relates to the properties of the binary codes used, need not here be discussed in detail and is schematically indicated by the connection 172 from decoder 146 to an input reflex decoder 170.

It will therefore be seen that the Gilham code converter section 107C described provides a convenient way of simulating an altitude (mode C) response from a target coded in the generally accepted Gilham code, while manipulating the code setting register 106C in a simple and practical manner.

The Military Resonder unit MIR which now will be described with reference to FIGS. 7 and 8 is largely similar to the Civil Responder unit and those of its components that have counterparts in the latter are designated with corresponding reference numerals, plus one hundred. There are, of course, only three mode channels in the Military Responder, associated with the modes "1" "2" and "3," and no Gilham code converter is used in any of these channels.

On the other hand, the Military Responder has two functions not present in the Civil Responder. These functions relate to SPI pulse operation and so-called Emergency operation. The circuitry for performing both these functions are schematically shown in FIG. 7 as enclosed in a box 250 termed the SPI and Emergency Logic, and this will later be described in detail with reference to FIG. 8. First, the functions performed by the Logic section will be described in a general way.

As earlier indicated in connection with FIG. 1b, in accordance with military specifications the Special Identification or SPI signal, instead of consisting of a single pulse, consists of a repetition of the response word 4.35 µs after its termination, usually with all of its digital pulse positions blank, only the framing pulses F1 and F2 being retained.

Military rules further specify that an aircraft can transmit a so-called Emergency response. An Emergency response is provoked by setting up the number 7300 (in decimal notation) in Mode 1 operation, and the number 7700 (decimal) in either Mode 2 or 3. An emergency response consists of three repetitions of the code word usually with intermediate (or digital) pulse positions of the code word blank, the words being repeated at intervals of 4.35 µs. The means by which the military SPI and Emergency codes are simulated according to the invention will now be described in detail with reference to FIGS. 7 and 8.

The SPI function of the SPI and Emergency Logic 250 will be considered first. Said Logic includes an OR-gate 252 having its three inputs connected to the respective SPI switches 254-1, -2 and -3, forming part of the code setters 206-1, -2 and -3. On depression of any one of these switches during the code-selecting operations, the OR-gate 252 delivers an output which is applied to the setting input of an SPI command binary 256. When binary 256 is set, it applies a voltage to one input of an AND-gate 258.

During the normal operation of the Military Responder unit for simulating a response code on appearance of a Response Command signal at terminal RC in a manner similar to that earlier described with reference to the Civil Responder, the Pulse Position Counter 212 operates to count 1.45-µs pulses up to the count preset in whichever one of the three settable code storers 206-1, -2 or -3 corresponds to the particular Mode 1, 2 or 3 called for by the IM signal that has appeared at one of the three terminals P3(1), P3(2) or P(3), as will now be understood. When the prescribed count has been reached, the end framing (F2) pulse appearing on matrix output line 211 acts to reset the binary 215, thereby disabling input gate 214 also as earlier described. In this case however, the F2 pulse on line 211 is simultaneously applied to the second input of AND-gate 258 in the Logic section 250. If the response code that has just ended included an SPI signal preset therein by depression of the appropriate SPI switch 254-1, -2 or -3, then AND-gate 258, by virtue of the setting of SPI command binary 256, is in a condition to pass the F2 pulse from line 211, by way of an OR-gate 260, to one input of an AND-gate 262. The other input of this AND-gate is connected to the normally energized output of a binary 264, and the AND-gate 262 therefore passes the F2 pulse to the input of a 4.35-µs delay device 266. After a corresponding delay, the F2 pulse reappears at the output of device 266 in the form of an Input Gate Reopening pulse on line 268. This line, as shown in FIG. 7, is connected by way of an OR-gate 270 to the setting input of input-gate-control binary 215, causing the binary to re-emit an enabling voltage to gate 214, thereby reopening said gate. It will be noted that OR-gate 270, not present in the Civil Responder (FIG. 5), serves in the Military Responder to set binary 215 to its gate-enabling condition selectively either with the Response Command pulse as in the Civil Responder or with the reopening pulse from Logic 250.

Input gate 214 therefore is now reopened 4.35 µs after it was closed to terminate the response code, and therefore proceeds to reapply time-base pulses through divider 216 to Code-Pulse-Position Counter 212, initiating a fresh counting cycle.

As will be recalled, military SPI operation usually requires this repeated counting cycle to be blank as to all of its intermediate code-pulse positions. To provide for this, the Reopening signal on line 268 is applied to the setting input of a binary 271. The resetting input of the binary is connected to receive the End-of-Range signal EoR, and the reset output of the binary provides a Digital Gate Control signal on a second output line 272 from the Logic 250. An AND-gate 275 having an enabling input connectable to a voltage source through a manual switch 273 is interposed in line 272. Line 272 is connected to one input of each of a series of AND-gates 274 interposed in the connections from each of the Code Setter devices 206 to the comparators 208. Normally, with binary 271 in its reset state and switch 273 closed, line 272 permanently applies an enabling voltage to all of the digital gates 274 to permit normal operation of the Responder. However, occurrence of the input-gate-reopening pulse on line 268 sets binary 271, so that line 272 is de-energized and the digital gates 274 are disabled or closed. Thus, the fresh counting cycle initiated by the reopening of input gate 214 will have all its digital positions intermediate the F1 and F2 pulses blank, as is frequently required for the military SPI signal.

The Reopening signal on line 268 is further applied to the input of a 3-counter-and-decoder 276, which has a "1" output line energized every time counter 276 has counted one Reopening signal and a "3" output line energized every time the counter has counted three Reopening signals. The "1" output of counter 276 is connected by way of an AND-gate 274 and an OR-gate 278 to a setting input of binary 264. AND-gate 274 has an enabling input connected to the set output of SPI command binary 256 and hence at this time energized. The binary 264 is therefore now set, disabling AND-gate 262 and thereby preventing the next following F2 signal from line 211 being passed to the delay device 266 and recommencing the described cycle. The requisite military SPI function is thus terminated. Binary 264 is subsequently reset by the EoR signal.

In the Emergency circuitry of Logic section 250 there is provided a set of three multi-input AND-gates 282-1, -2 and -3. AND-gate 282-1 has its inputs connected to appropriate output lines of the Mode-1 Code Setter device 206-1, so as to have all said inputs energized whenever the code preset by the device is the Mode-1 Emergency code, 7300 in decimal notation. Similarly gates 282-2 and 282-3 have their inputs connected to appropriate outputs of the Mode-2 and Mode-3 Code Setter devices 206-2 and 206-3 respectively, so as to have all their inputs energized whenever the Mode-2 and Mode-3 Emergency code combination 7700 has been preset in the respective devices. If an Emergency code has been preset in any one of the three Code Setters, the associated AND-gate 282-1, -2 or -3 produces an output which is passed by way of an OR-gate 284 to the setting input of an Emergency Command binary 286. The Emergency Command signal from binary 286 is applied by way of a second input of OR-gate 260 and AND-gate 262 to the input of the 4.35-µs delay device 266 to produce a Reopening Signal on the line 268 which will reopen the time-base input gate 214, 4.35 µs after the gate is closed on termination of the aforedescribed (blank) response word. The Emergency Command signal from binary 286 is also simultaneously applied to AND-gate 288 interposed in the "3" output line of counter 276 so that the binary 264 will only be reset after three F2 pulses have been passed through delay device 266 to reopen input gate 214. In the Emergency operation, therefore, it will be seen that the Logic 250 operates in response to the setting-up of an Emergency code combination in any one of the Code Setters 206 to issue four consecutive response words at 4.35µs intervals at the output terminal MR, in accordance with the previously specified requirements.

The reset inputs of binaries 256 and 286 can be energized, over circuits not further illustrated, whenever it is desired to disable the SPI and E (Emergency Command) sections, respectively, of unit 250.

Some additional practical details will now be given concerning the various digital setting devices used in the simulator of the invention and their associated circuitry.

As earlier indicated for the case of the Code setters in the Responder sections of the machine, all of the digital setting devices are preferably designed to operate in the decimal system of notation for convenience in manipulation. Such a decimal setting device will include a suitable number of decimal stages, each stage comprising a ten-position multiswitch manually operable to any one of its ten positions to energize an associated output line, indicating a selected digit from 0 through 9. The comparator, counter and decoder matrix associated with each such digital setting device would be suitably wired to permit the desired comparison between the count present in the counter and the number preset in the setting device, stage by stage, as is well understood in the art.

Considering specifically the RNGE selecting channel in the Coordinate Selector and Mode Sequencer unit (FIG. 3), the RNGE setter 7 may include five decimal multiswitch stages. The RNGE counter 2 may then comprise five decade stages for a total counting capacity of one hundred thousand 0.1-µs clock or time-base pulses (i.e. a 10 ms. counting cycle). Each counter stage may have e.g. four output lines to deliver a decimal digit in binary-coded form to a corresponding stage of the Decoder Matrix 4, in which the digit is decoded to decimal form and is applied over one of ten outputs of the Decoder stage to a corresponding stage of the RNGE comparator 6, for comparison therein with the corresponding preset digit, as earlier described. With such an arrangement, and taking into consideration that the start of every ranging cycle (as determined by the occurrence of the P3 pulse) occurs a substantial time after counter 2 has counted past zero, it still is possible to preset range values equivalent to one millisecond or more, that is, distances of 150 kilometers or greater. The accuracy of the range selection is, of course, equivalent to 0.1 µs or 15 meters.

If desired, provision may be made for directly setting up distance values in Range Setter 7, expressed in a selected unit distance. This requires, essentially, the provision of suitable pulse-rate-dividing means ahead of the input of RNGE counter 2. If for example it is desired to use nautical miles (1 naut. mile=1854 km.) and its decimal submultiples as the distance unit in range setter 7, there may be provided a dividing counter (not shown) ahead of counter 2 so as to feed 12.3-µs instead of 0.1-µs pulses to the counter input. Each 12.3-µs pulse interval counted by the counter will then correspond to a range increment of 1 nautical mile, as will be immediately verified by means of the ranging formula $D=\frac{1}{2}cT$ earlier referred to.

In the AZAN selector channel, the azimuth-angle-setter device 38 may conveniently include only three decade multiswitch stages for the setting up of azimuth angles from 0 to 360° in one-degree increments. The time duration of one simulated revolution of the scanning antenna will be determined by the capacity of AZAN counter 22 and the adjusted pulse rate of pulse generator 26 as earlier noted. The source of external azimuth signals, when external synchronizing means are used, which source is connected to terminal 25 as earlier indicated, may conveniently constitute the scanner (photoelectrical or electrical in character) of a conventional coded disk having concentric tracks with alternate segments (opaque and transparent, or insulating and conductive, as the case may be), representing azimuth values in the reflex binary code. The capacity of AZAN counter 22 would then preferably correspond to the number of tracks provided on the code disk and the counter would be wired to provide a reflex binary output.

The practical construction of the various components and sections of the simulator disclosed herein can be varied widely and may depart considerably from what has been shown. This is especially true of the logical circuitry. As one example of such modifications, FIG. 9 shows in fragmentary form an alternative construction of a Responder unit according to the invention. Since the modification to be described is applicable to both the Civil Responder CIR (FIG. 5) and the Military Responder MIR (FIG. 7), the mode channels, of which three are shown, have not been designated specifically as A, B, C and D or as 1, 2 and 3, but are designated X, Y and Z instead. Components of the Responder in FIG. 9 corresponding to components in FIG. 5 are designated with the same reference numbers with 200 added. In this modification, it will be seen that only a single comparator 308 is provided. The lower inputs of the comparator are connected to the outputs of decoder matrix 310 associated with a Code-Pulse-Position Counter 312 similar to counter 112 (FIG. 5) or 212 (FIG. 7). The upper inputs of comparator 308 are connected to the outputs of respective OR-gates generally designated 321, each of the OR-gates having corresponding-stage outputs of all of the Code Setters 306-X, -Y and -Z connected to respective inputs thereof. Interposed in the output lines of each of the Code Setters 306-X, -Y and -Z are AND-gates generally designated 320-X, -Y and -Z. These may be identical with the AND-gates designated 274-1, -2 and -3 in FIG. 7. The AND-gates 320-X, -Y and -Z have enabling inputs which are connected to the set outputs of the binaries 322 associated with the respective IM lines P3(X), (Y) and (Z). The output of the single comparator 308 is connected by way of the Pulse Gauging circuit 326 (which may be similar to the one referenced 126 and shown in FIG. 9) to the Responder output terminal.

The general operation of this embodiment is similar to that of either of the Responders shown in FIGS. 5 and 7, the only difference being that the mode selecting function, instead of being accomplished in the AND-gates 120A, 120B, 120C and 120D (FIG. 5) or 220-1, -2 and -3 (FIG. 7) at the outputs of the respective comparators, is in this case performed in the AND-gates 320-X, -Y and -Z at the outputs of the Code Setters, thus enabling a common comparator to be used for all the modes.

What we claim is:

1. A secondary-radar response simulator comprising:
a source of recurrent command pulses representing azimuth and range of a simulated target during consecutive major time periods representative of successive sweeps of a simulated radar antenna;
responder means connected to receive said command pulses, said responder means including a plurality of selectively presettable code storers and circuit means for the selective triggering of any one of said code storers in response to an incoming command pulse to generate a code signal conforming to the setting of the respective code storer;

and mode-selector means connected to said circuit means for controlling the selection of any one of said code storers.

2. A simulator as defined in claim 1 wherein said mode-selector means comprises a source of trigger pulses with recurrence cycles which are short in comparison with said major time periods, and switch means for selectively channeling said trigger pulses into a plurality of different inputs of said circuit means.

3. A simulator as defined in claim 2 wherein said source of trigger pulses comprises a generator of gating signals occurring at successive instances within each of said recurrence cycles, said mode-selector means further comprising a plurality of coincidence gates jointly controlled by said gating signals and by output voltages from said switch means.

4. A simulator as defined in claim 2 wherein said mode-selector means further includes cycle-counting means presettable to modify the effect of said switch means in a predetermined sequence over a plurality of consecutive recurrence cycles.

5. A simulator as defined in claim 2 wherein said mode-selector means further includes sweep-counting means presettable to modify the effect of said switch means in a predetermined sequence over a plurality of consecutive major time periods.

6. A simulator as defined in claim 2 wherein said mode-selector means further includes cycle-counting means presettable to modify the effect of said switch means in a predetermined sequence over a plurality of consecutive recurrence cycles, and sweep-counting means presettable to become effective in a predetermined position of said cycle-counting means for varying a part of said sequence according to a predetermined pattern over a plurality of consecutive major time periods.

7. A simulator as defined in claim 1 wherein said source of command pulses includes an adjustable range register and an adjustable azimuth-angle register, first and second counting means each adapted to receive timing pulses for progressive stepping thereby, first comparison means connected between said first counting means and said range register for ascertaining a count of said first counting means equaling the value stored in said range register, second comparison means connected between said second counting means and said azimuth-angle register for ascertaining a count of said second counting means equaling the value stored in said azimuth register, and coincidence-gate means jointly controlled by said first and second comparison means for generating a command pulse upon concurrent ascertainment of such count thereby.

8. A simulator as defined in claim 7 wherein said source of command pulses further includes an adjustable azimuth-extent register, third counting means connected to be stepped by the output of said second comparison means, third comparison means connected between said third counting means and said azimuth-extent register for ascertaining a count of said third counting means equaling the setting of said azimuth-extent register, and blocking means for the output of said second comparison means connected to be made effective by said third comparison means upon ascertainment of such count thereby.

9. A simulator as defined in claim 7 wherein said source of command pulses further includes an additional range register, additional counting means connected to be stepped in synchronism with said first counting means, additional comparison means connected between said additional range register and said additional counting means for ascertaining a count thereof equaling the value stored in said additional range register, and auxiliary output means controlled by said additional comparison means for producing a garbling signal upon ascertainment of such count.

10. A simulator as defined in claim 1 wherein each of said code storers comprises a multidigit register, counting means adapted to receive stepping pulses, comparison means connected to said counting means and each of said multidigit registers for scanning the digital positions thereof, and output means controlled by said comparison means for producing a series of outgoing pulses to form a response word corresponding to the multidigit code of the register so scanned.

11. A simulator as defined in claim 10, further comprising pulse-shaping means in said output means presettable for converting each of said outgoing pulses into a signal pulse of a width selectively variable within predetermined limits.

12. A simulator as defined in claim 11 wherein said pulse shaper includes means triggerable by each of said outgoing pulses for producing a train of counting pulses, a pulse-width register, counter means connected to be stepped by said counting pulses, and comparison means connected between said counter means and said pulse-width register for ascertaining a count equaling the setting of said pulse-width register.

13. A simulator as defined in claim 10 wherein said output means includes a special pulse generator triggerable by said counter means to produce an identification pulse following said response word.

14. A simulator as defined in claim 10 wherein said output means includes emergency circuitry responsive to a predetermined setting of at least one of said registers, simulating an emergency condition, to produce a pulse sequence following said response word, with predetermined spacing, to signify such condition.

15. A simulator as defined in claim 14 wherein said response includes a leading pulse, a trailing pulse and a variable number of intervening digital pulses, said emergency circuitry including recycling means for repeating a response word and blanking means for suppressing said intervening pulses in the repeated response word, thereby producing said pulse sequence as a replica of said leading and trailing pulses.

16. A simulator as defined in claim 10 wherein one of said code storers includes code-converging means connected between the register thereof and said comparison means.

17. A simulator as defined in claim 1 wherein said responder means comprises a civil responder unit and a military responder unit, said mode-selector means being operable to direct said command pulses alternatively to said responder unit.

References Cited

UNITED STATES PATENTS 3,205,293   9/1965   Zyskowski _____ 35—10.4

RICHARD A. FARLEY, *Primary Examiner.*

RODNEY D. BENNETT, *Examiner.*

T. H. TUBBESING, *Assistant Examiner.*